US011694205B2

(12) United States Patent
Learned et al.

(10) Patent No.: US 11,694,205 B2
(45) Date of Patent: Jul. 4, 2023

(54) SYSTEMS AND METHODS FOR DATA BREACH DETECTION USING VIRTUAL CARD NUMBERS

(71) Applicant: Capital One Services, LLC, McLean, VA (US)

(72) Inventors: Jacob Learned, Brooklyn, NY (US); Michael Saia, New York, NY (US); Max Miracolo, Brooklyn, NY (US); Kaylyn Gibilterra, New York, NY (US)

(73) Assignee: Capital One Services, LLC, McLean, VA (US)

( * ) Notice: Subject to any disclaimer, the term of this patent is extended or adjusted under 35 U.S.C. 154(b) by 135 days.

(21) Appl. No.: 17/161,732

(22) Filed: Jan. 29, 2021

(65) Prior Publication Data

US 2022/0245640 A1    Aug. 4, 2022

(51) Int. Cl.
| | | |
|---|---|---|
| *G06Q 20/40* | (2012.01) | |
| *G06N 3/08* | (2023.01) | |
| *G06Q 20/34* | (2012.01) | |
| *H04L 9/40* | (2022.01) | |

(52) U.S. Cl.
CPC ........... *G06Q 20/4016* (2013.01); *G06N 3/08* (2013.01); *G06Q 20/351* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| 7,182,254 B2 | 2/2007 | Changryeol |
| 8,086,531 B2 | 12/2011 | Litster et al. |
| 9,324,066 B2 | 4/2016 | Archer et al. |

(Continued)

FOREIGN PATENT DOCUMENTS

WO    2016/028442 A1    2/2016

OTHER PUBLICATIONS

International Search Report and Written Opinion dated Apr. 11, 2022 in International Application No. PCT/US2022/070406 (14 pages).

*Primary Examiner* — Namrata Boveja
*Assistant Examiner* — Divesh Patel
(74) *Attorney, Agent, or Firm* — Bookoff McAndrews, PLLC

(57) ABSTRACT

Disclosed are systems and methods for data breach identification. The method may include: generating virtual card number (VCN) data sets; storing the VCN data sets on a first database; receiving one or more compromised VCN data sets stored on a second database and obtained from a scan of unindexed websites; comparing the compromised VCN data sets with the VCN data set stored on the first database to determine whether the VCN data sets have been compromised; for each compromised VCN data set, training the recurrent neural network (RNN) to associate the compromised VCN data sets with one or more sequential patterns found within the compromised VCN data sets to generate a trained RNN; receiving a first VCN data set from the first database; determining whether the first VCN data set matches a compromised VCN data set; and transmitting a message indicating the determination to a user or provider device.

20 Claims, 8 Drawing Sheets

(56) References Cited

U.S. PATENT DOCUMENTS

| | | |
|---|---|---|
| 10,268,840 B2 | 4/2019 | Lockhart, III et al. |
| 10,419,455 B2 | 9/2019 | Park et al. |
| 10,523,681 B1* | 12/2019 | Bulgakov ............ H04L 63/1425 |
| 2015/0073981 A1 | 3/2015 | Adjaoute |
| 2015/0339673 A1* | 11/2015 | Adjaoute ............ G06Q 20/4016 |
| | | 705/30 |
| 2016/0086171 A1 | 3/2016 | Rehe et al. |
| 2017/0053115 A1* | 2/2017 | Healy .................... G06Q 20/20 |
| 2018/0330122 A1 | 11/2018 | Margalit et al. |
| 2019/0318126 A1 | 10/2019 | Mascaro |
| 2019/0385170 A1 | 12/2019 | Arrabothu et al. |
| 2020/0364537 A1 | 11/2020 | Farivar et al. |
| 2021/0342846 A1* | 11/2021 | Berger .................... H04L 9/085 |

* cited by examiner

SYSTEMS AND METHODS FOR DATA BREACH DETECTION USING VIRTUAL CARD NUMBERS

TECHNICAL FIELD

Various embodiments of the present disclosure relate generally to data breach identification and, more particularly, to systems and methods for training a recurring neural network to detect data breaches using virtually generated card numbers.

BACKGROUND

Following a data breach, exposed customer and merchant/retailer information may be transferred, sold, or distributed to others through unindexed websites which are not searchable through any standard search engine or browser. This collection of unindexed websites is often referred to as the dark web. In many cases, large volumes of data may be "dumped" on the dark web, and individuals capable of accessing these sites will obtain retailer (e.g., merchant) and customer data in order to engage in fraudulent activity. In particular, stolen virtual credit card data associated with physical cards are used to make fraudulent purchases. Accordingly, there exists a need to detect data breaches quickly and accurately in order to protect retailers and customers from fraud associated with compromised credit card data.

The systems and methods of the present disclosure may solve one or more of the problems set forth above and/or other problems in the art. The scope of the current disclosure, however, is not defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for training a recurring neural network to detect data breaches using virtual card numbers. Each of the examples disclosed herein may include one or more of the features described in connection with any of the other disclosed examples. The systems and methods disclosed herein provide a technical solution to technical problems associated with detecting data breaches. Aspects of this disclosure will result in faster detection of data breaches using virtual card numbers.

In one embodiment, a computer-implemented method for training and using a recurrent neural network for data breach identification is disclosed. The method may comprise: generating a plurality of virtual card numbers, wherein each one of the plurality of virtual card numbers is associated with a user device, a provider device, and security data to generate a virtual card number data set; storing one or more of the virtual card number data sets on a first database; receiving one or more compromised virtual card number data sets, wherein the one or more compromised virtual card number data sets is parsed from compromised data stored on a second database isolated from communication with the first database, and wherein the compromised data is obtained from a scan of unindexed websites on a network; comparing the one or more compromised virtual card number data sets with the one or more virtual card number data sets stored on the first database; determining whether one of the one or more of the virtual card number data sets has been compromised based on the comparison; for each of the one or more compromised virtual card number data sets, training the recurrent neural network to associate the compromised virtual card number data set with one or more sequential patterns found within the compromised virtual card number data set, to generate a trained recurrent neural network; receiving a first virtual card number data set from the first database; determining, using the trained recurrent neural network whether the first virtual card number data set matches a compromised virtual card number data set; and upon determining the first virtual card number data set matches a compromised virtual card number data set, transmitting a message to the user device or the provider device associated with the first virtual card number data set indicating the first virtual card number data set is compromised.

In another embodiment, a computer-implemented system for training and using a recurrent neural network for data breach identification is disclosed. The system may comprise: at least one memory device having processor-readable instructions stored therein; and at least one central processing unit including at least one processor configured to access the memory device and execute the processor-readable instructions, which when executed by the processor configures the processor to perform a plurality of functions, including functions for: generating a plurality of virtual card numbers, wherein each one of the plurality of virtual card numbers is associated with a user device, a provider device, and security data to generate a virtual card number data set; storing one or more of the virtual card number data sets on a first database; receiving, by the one or more processors, one or more compromised virtual card number data sets, wherein the one or more compromised virtual card number data set is parsed from compromised data stored on a second database isolated from communication with the first database, and wherein the compromised data is obtained from a scan of unindexed websites on a network; comparing the one or more compromised virtual card number data sets with the one or more virtual card number data sets stored on the first database; determining whether one of the one or more of the virtual card number data sets has been compromised based on the comparison; training the recurrent neural network to associate the compromised virtual card number data set with one or more sequential patterns found within the compromised virtual card number data set, to generate a trained recurrent neural network; receiving a first virtual card number data set from the first database; determining, using the trained recurrent neural network, whether the first virtual card number data set matches a compromised virtual card number data set; and upon determining the first virtual card number data set matches a compromised virtual card number data set, transmitting a message to a user or provider device associated with the first virtual card number data set indicating the first virtual card number data set is compromised.

In yet another embodiment, a computer-implemented method for training and using a recurrent neural network for data breach identification is disclosed. The method may comprise: generating a plurality of virtual card numbers, wherein each one of the plurality of virtual card numbers is associated with a user device, a provider device, and security data to form a virtual card number data set; storing, by the one or more processors, one or more of the virtual card number data set on a first database; receiving one or more compromised virtual card number data sets, wherein the one or more compromised virtual card number data sets is parsed from compromised data stored on a second database isolated from communication with the first database, and wherein the compromised data is obtained from a scan of unindexed websites on a network; comparing the one or more compromised virtual card number data sets with the one or more virtual card number data sets stored on the first database; determining one of the one or more of the virtual card number data sets has been compromised based on the comparison and whether a pre-determined threshold has been met; for each of the one or more compromised virtual card number data sets, training the recurrent neural network to associate the compromised virtual card number data set with one or more sequential patterns found within the compromised virtual card number data set, to generate a trained recurrent neural network; receiving a first virtual card number data set from the first database; determining, using the trained recurrent neural network whether the first virtual card number data set is a compromised virtual card number data set; upon determining the first virtual card number data set is a compromised virtual card number data set, transmitting a message to a user or provider device associated with the first virtual card number data set indicating the first virtual card number data set is compromised; receiving a request to authenticate a transaction; and declining to authenticate the transaction upon determining that the transaction involves a compromised virtual card number data set.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
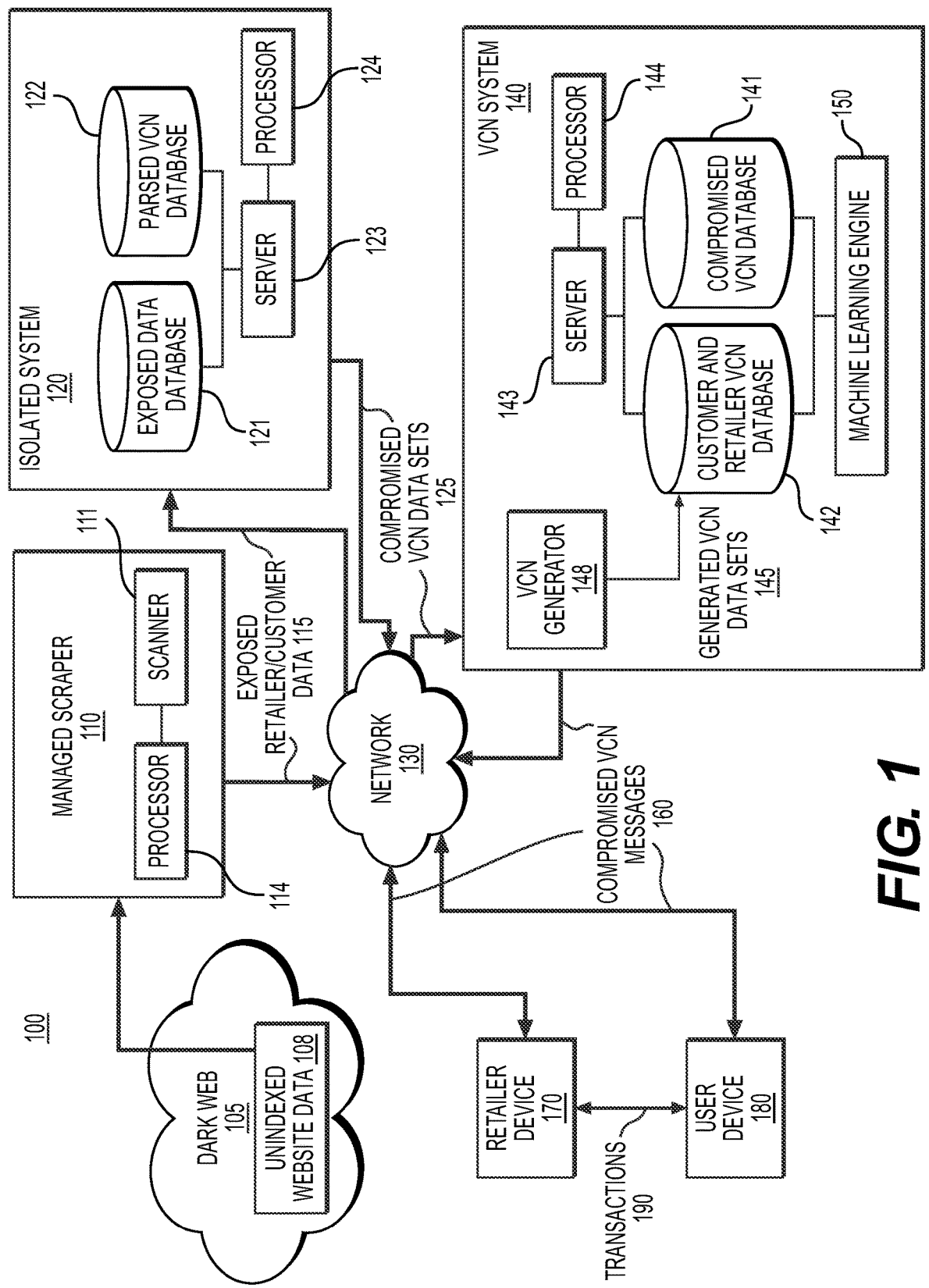
FIG. 1 depicts an exemplary system for training and using a recurrent neural network for data breach identification and notification of retailers and customers, according to one or more embodiments.

Aspects of the present disclosure relate generally to training and executing a recurrent neural network (RNN), for data breach identification using virtual card numbers. A specifically customized training of RNNs, combined with practical application of the respectively trained RNNs for providing user-specific feedback, are unconventional and innovative automations which necessarily achieve technological improvements through the specific process described more in detail below, in a sharp contrast to merely providing a well-known or routine environment for performing a manual or mental task. While RNNs are referenced throughout the application, alternative neural networks or decision support tools may be used. For example, any one or more of a convolutional neural network (CNN), a regional convolutional neural network (R-CNN), and/or a decision tree may be used without departing from the scope of the disclosure.

Compromised credit card data is often transferred or "dumped" on the dark web, a collection of unindexed websites that are not accessible through typical search engines and browsers. According to aspects of the present disclosures, virtual credit card numbers, including associated security data, are generated on behalf of a customer and tied to a single retailer or small amount of retailers for use in online transactions. The generated security data in some embodiments may be the same as security data associated with a physical card for a customer. For example, the security data may comprise one or more of a card verification value, a card verification code, or a personal identification number. In some embodiments, the generated security data may be an address or zip code that is not associated with a customer's actual physical address or zip code. In this manner, customer personal information such as the customer's actual physical address and zip code may not be comprised in the event of a breach of the generated virtual credit card security data. The security data may further include identifiers or other information not typically present in typical security data, in order to enable a managed scraper to more easily find such data on the dark web. When a data breach occurs, exposed virtual credit card numbers may be dumped onto one or more unindexed dark websites. According to the disclosure, dark websites are automatically scraped and scanned for exposed virtual credit card number data. In some embodiments, exposed credit card numbers scraped from these dark websites are compared with virtual credit card number data stored in a database of virtual numbers linked with retailers and customers. In further embodiments, it is possible to alert retailers regarding potential security breaches where a large amount of virtual numbers associated with the retailers are found on the dark web in a short amount of time since the last scan.

Further, using an RNN, the system may automatically detect, within an predetermined confidence threshold, if a merchant/retailer has a potential security breach based on the presence of virtual card numbers exposed on the dark web that have been tied to that retailer. Additionally, in some embodiments, the system may factor in retailer virtual card numbers on the dark web during transaction decisioning to mitigate or prevent fraudulent charges. A risk model may be generated based on the exposure of virtual card numbers on the dark web that can factor into transaction approval decisioning on a merchant-by-merchant basis. In some embodiments, the system may automatically notify customers, delete exposed VCNs, and regenerate unique VCN numbers for the customer and retailer in order to mitigate the possibility of a bad actor using a valid virtual number that has been exposed on the dark web. Accordingly, the systems and methods of the present disclosure provide a technical solution for mitigating security, fraud, and financial risks to retailers and users stemming from online data breaches.

Reference will now be made in detail to aspects of the disclosure, examples of which are illustrated in the accompanying drawings. Wherever possible, the same or similar reference numbers will be used through the drawings to refer to the same or like parts or components. The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 2:
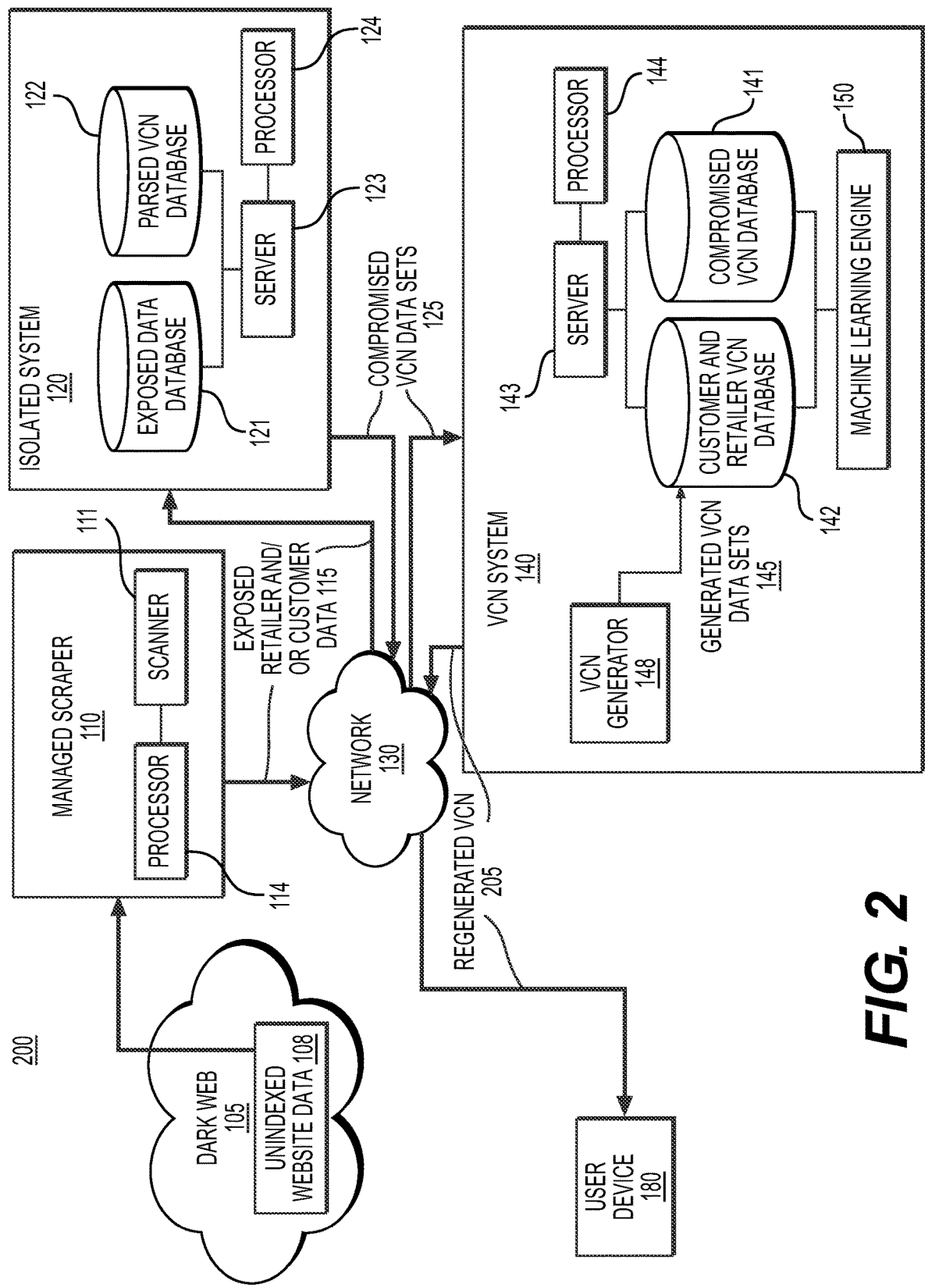
FIG. 2 depicts another exemplary system for training and using a recurrent neural network for data breach identification and regeneration of virtual card numbers, according to one or more embodiments.
Figure 3:
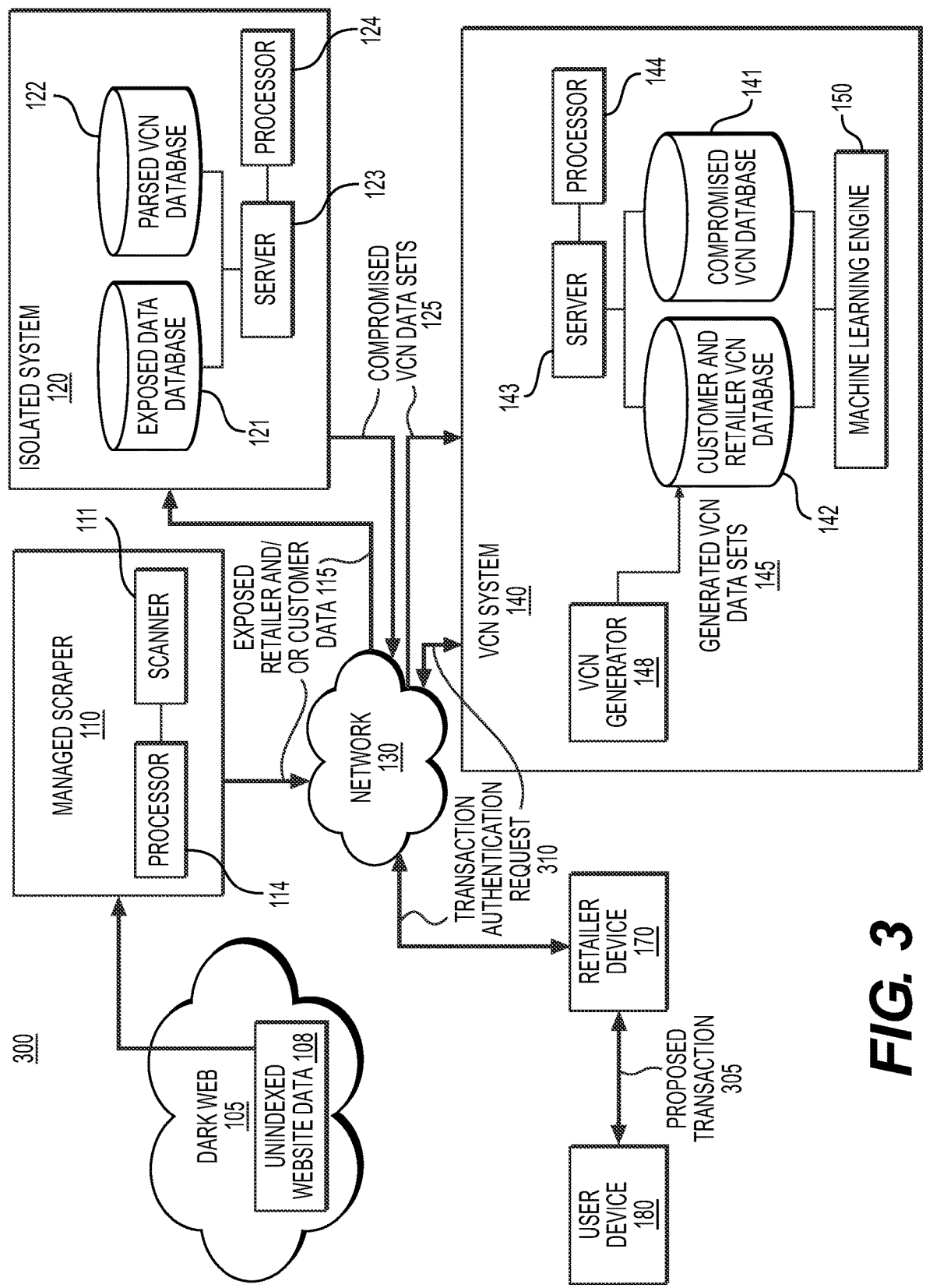
FIG. 3 depicts an additional exemplary system for training and using a recurrent neural network for data breach identification and authentication of virtual card numbers, according to one or more embodiments.

FIGS. 1-3 are diagrams depicting exemplary system environments 100-300 for training and using a recurrent neural network for data breach identification using virtual card numbers, according to embodiments of the present disclosure. As shown in FIG. 1, system environment 100 includes dark web 105 (e.g., unindexed websites), a managed scraper 110, isolated system 120, VCN system 140, a retailer device 170, and a user device 180. The managed scraper 110, isolated system 120, and VCN system 140 may include computing systems, such as system 600 described with respect to FIG. 6. As such, managed scraper 110, isolated system 120, and VCN system 140 may include one or more processors and a memory for storing and executing applications or software modules of system environments 100-300. For example, managed scraper 110, isolated system 120, and VCN system 140 may include one or more software modules to communicate with user devices and/or other servers through a network 130. The dark web 105 comprises unindexed websites which are not searchable through a typical search engine or browser, and further comprises unindexed website data 108. The managed scraper 110 comprises a processor 114 and a scanner 111. The managed scraper 110 retrieves/obtains unindexed website data 108 and scans the data for exposed retailer and/or customer data 115. Exposed retailer and/or customer data 115 may include virtual card numbers and associated security data, which together form virtual card number (VCN) data sets. The managed scraper 110 may obtain exposed retailer and/or customer data 115 from the scan and sends that data to isolated system 120 over a network 130. Network 130 may be a 3G/4G/5G wireless network, a local area network (LAN), a wide area network (WAN), a private data network, a satellite communications network (e.g., SATCOM), a virtual private network (VPN), and/or a public data network, such as the Internet. In some embodiments, the connections between the managed scraper 110, isolated system 120, and other systems connected to network 130 may be secured. For example, the connections may be secured using one or more communication-security techniques such as, but not limited to, Secure Sockets Layer (SSL), Two Way SSL, Web Socket Secure, Transport Layer Security (TLS), Secure Shell (SSH), Virtual Private Network (VPN), Layer 2 Tunneling Protocol (L2TP), IP Security (IPSec), Internet Key Exchange version 2 (IKEv2), Point-to-Point Tunneling Protocol (PPTP), Trusted Computer System Evaluation Criteria (TCSEC)/Orange Book techniques, ISO/IEC 15443, 15408 and/or 17799 techniques, public/private key techniques such as the RSA algorithm, and other cryptographic algorithms Further with respect to FIGS. 1-3, the isolated system 120 comprises a server 123, a processor 124, an exposed data database 121, and a parsed VCN database 122. The parsed VCN database 122 may be provided in a shared database (e.g., a single database) or as one or more separate databases. The isolated system 120 receives and stores the exposed retailer and/or customer data 115 on the exposed data database 121. This data is further analyzed, and virtual card numbers and the associated security data are parsed to generate one or more compromised VCN data sets 125. The one or more compromised VCN data sets 125 are isolated from the other exposed data and stored on the parsed VCN database 122, which is separate from exposed data database 121. The isolated data is further cleaned to ensure that no other data, such as malware or illegal content, are stored on the parsed VCN database 122. The one or more compromised VCN data sets 125 are then transmitted to the VCN system 140 over network 130.

Further referencing FIGS. 1-3, the VCN system 140 comprises a server 143, a processor 144, a VCN generator 148, a customer and retailer VCN database 142, a compromised VCN database 141, and a machine learning engine 150. The VCN system 140 may receive the one or more compromised VCN data sets 125 over network 130 and store the data sets on compromised VCN database 141. The compromised VCN database 141 may be provided in a shared database (e.g., a single database) or as one or more separate databases. In some embodiments, a customer may request that a VCN be generated and associated with a user account. In response to a customer request, VCN data sets 145 are generated by VCN generator 148 and stored on the customer and retailer VCN database 142. The customer and retailer VCN database 142 may be provided in a shared database (e.g., a single database) or as one or more separate databases. The generated VCN data sets 145 include VCNs as well as associated security data. The associated security data may include one or more of a physical address, zip code, security code, email address, phone number, birthday, social security number, or other information which may be used to verify and authenticate a credit card transaction. In some embodiments, the associated security data with the VCN is different from a customer's actual information, for example, the generated physical address and zip code used as associated security data for a customer's VCN may be different from the customer's actual physical address. In some embodiments, one or more of the generated VCN data sets 145 may be associated with a user account associated with a customer. For example, other databases (not shown) in VCN system 140 may include one or more e-mail accounts associated with a customer, retailer, and/or a third-party marketplace. For example, the user accounts for retailer device 170 may include a clothing store account and the user account for the third-party marketplace may include an account for an online marketplace for handmade goods. As noted above, in some embodiments, a customer may request a VCN to be generated and associated with a user account.

The one or more compromised VCN data sets 125 stored on the compromised VCN database 141 may be compared to the generated VCN data sets 145. Based on the comparison, the VCN system 140 may determine whether the generated VCN data sets 145 stored on the customer and retailer VCN database 142 has been compromised on the dark web 105. While not shown, the VCN system 140 may also contain databases with other information which may be relevant to authenticating transactions, including, for example, databases containing customer or retailer transaction information including credit card transaction histories and banking information. The VCN system 140 also comprises a machine learning engine 150, which may be an RNN trained based on the data stored in compromised VCN database 141 and the customer and retailer VCN database 142. This is further described below with respect to the methods disclosed in FIGS. 4-5.

System environment 100 may also include a retailer device 170 having one or more server systems (not shown). As used herein, a retailer (e.g., merchant, provider, etc.) is a person or company that trades in commodities, such as products and/or services. Further, while a single retailer device 170 is depicted in FIG. 1, it is understood that retailer device 170 may include any number or various types of retailers or merchants. By way of non-limited example, retailer device 170 may include a retailer, a third-party marketplace, a hotel, an airline, or any other entity that provides goods, products, and/or services. Retailer device 170 may be a point of sale (POS) system such as a hardware POS device at a physical location, such as a store, a restaurant, a transaction booth, a transaction cart, a food truck, an office, a place of residence, a vending machine, a gaming establishment, or any other physical location where purchase of goods or services may take place by a customer via an electronic transaction. Retailer device 170 also may be a portable device carried by a retailer, a merchant, a seller, a sales agent, or a delivery agent, which reads, accepts, or validates an electronic transaction, such as a credit card reader, a mobile payment reader, a payment processing application, or any other portable device serving the purpose of accepting and/or processing payments for commerce of goods or services. Additionally, or alternatively, the retailer device 170 may be a virtual or online POS system for allowing a customer to engage in an electronic commerce transaction on a user device 180 over a network. The retailer device 170 further may cause a user interface to present voice notifications, application notifications, tactile notifications, and/or graphic notifications to a customer.

As shown in FIG. 1, system environment 100 may include customer devices, such as, for example, user device 180. User device 180 may be a computing device in communication with VCN system 140 and/or retailer device 170 via network 130. User device 180 may be a computer system, such as a computer, a mobile computer, or a cellular phone, that is operated by a customer. User device 180 may include a memory, one or more processors, communication interfaces, input devices, and output devices, as detailed further below with reference to FIG. 6. User device 180 may include one or more communication interfaces and a web browser application (not shown). The communication interface for user device 180 may include one or more cellular radios, Bluetooth, Wi-Fi, near-field communication radios, or other appropriate communication devices for transmitting and receiving information. The communication interface (not shown) facilitates communication between user device 180, retailer device 170 and/or VCN system 140 over network 130. Multiple communication interfaces may be included in user device 180 for providing multiple forms of communication between user device 180 and VCN system 140 or retailer device 170 via network 130. For example, communication may be achieved with network 130 through wireless communication (e.g., Wi-Fi, radio communication, etc.) and/or a wired data connection (e.g., a universal serial bus, an onboard diagnostic system, etc.) or other communication modes. The user device 180 further may cause a user interface to present voice notifications, application notifications, tactile notifications, and/or graphic notifications to a customer. Communications over network 130 may be secured using the techniques described above.

User device 180 may include a web browser application (not shown) which provides an interface for accessing websites through a network (e.g., the Internet). Web browser application may include, for example, Internet Explorer®, Chrome®, Safari®, Edge®, or any other web browser known in the art. Web browser application may display a user interface including websites, such as, for example, a website of retailer device 170. The user may conduct transactions 190, for example the purchases of goods and/or services online, with retailer device 170 via the website on web browser application through a network. The web browser application may also provide an interface for accessing the user e-mail account of the user. For example, the user may access their user e-mail account on web browser application through a network 130. It is understood that web browser application may include any type of application (e.g., a mobile application), such as third-party applications provided by retailer device 170, for transacting with the retailer device 170.

As additionally shown in FIG. 1, upon determining that one or more VCNs have been compromised, the VCN system 140 may transmit compromised VCN messages 160 to a retailer device 170 and/or a user device 180 indicating that one or more VCN data sets have been comprised and exposed on the dark web. In some embodiments, a user interface of retailer device 170 and/or user device 180 may present a voice notification, application notification, tactile notification, and/or graphic notification regarding the compromised or exposed VCN data sets. Accordingly, the customer or retailer may deactivate exposed VCNs to prevent future fraudulent purchases.

With respect to FIG. 2 and system 200, the VCN system 140, in some embodiments, may automatically regenerate a VCN after determining that a customer VCN data set has been exposed. The VCN system 140 cancels a prior customer VCN and automatically transmits a regenerated VCN 205 to a user device 180. In this manner, fraud or illegal use of a customer's VCN may be prevented more quickly than in prior systems, resulting in a technological improvement over prior methods.

With respect to FIG. 3 and system 300, the VCN system 140 in some embodiments may be used to authenticate a transaction. A user device 180 may initiate a proposed transaction 305 with retailer device 170 using a VCN and accompanying security data. The retailer device 170 may then transmit a transaction authentication request 310 to the VCN system 140. Next, the VCN system may determine whether the proposed transaction 305 involves a VCN that it likely to be compromised or exposed on the dark web within a predetermined confidence interval. Based on this determination, the VCN system 140 may notify the retailer. In some embodiments, the VCN system 140 may automatically decline the transaction upon determining that a VCN associated with the transaction has been compromised.

Figure 4:
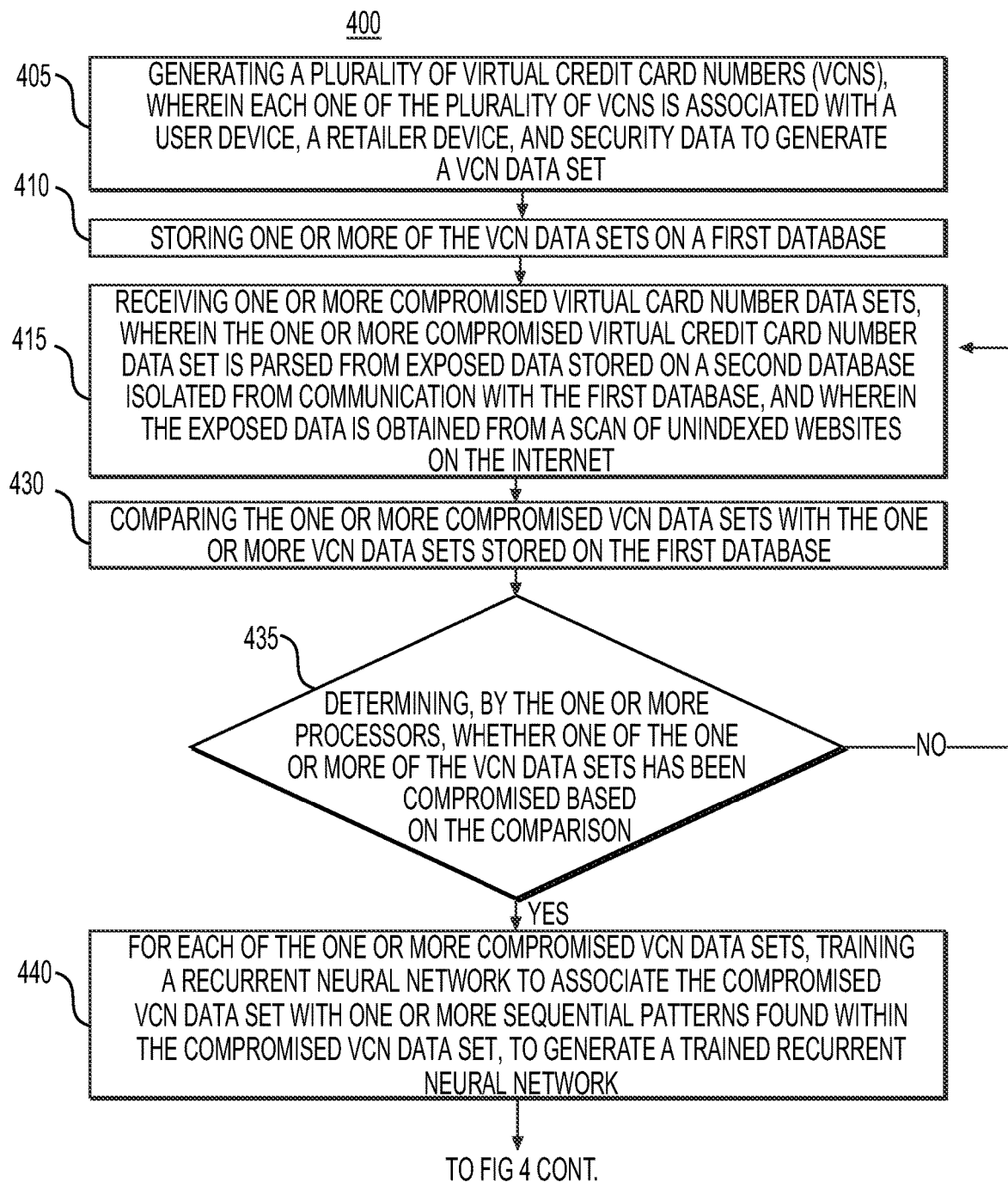
FIG. 4 depicts a flowchart of an exemplary method for training and using a recurrent neural network for data breach identification.
Figure 4:
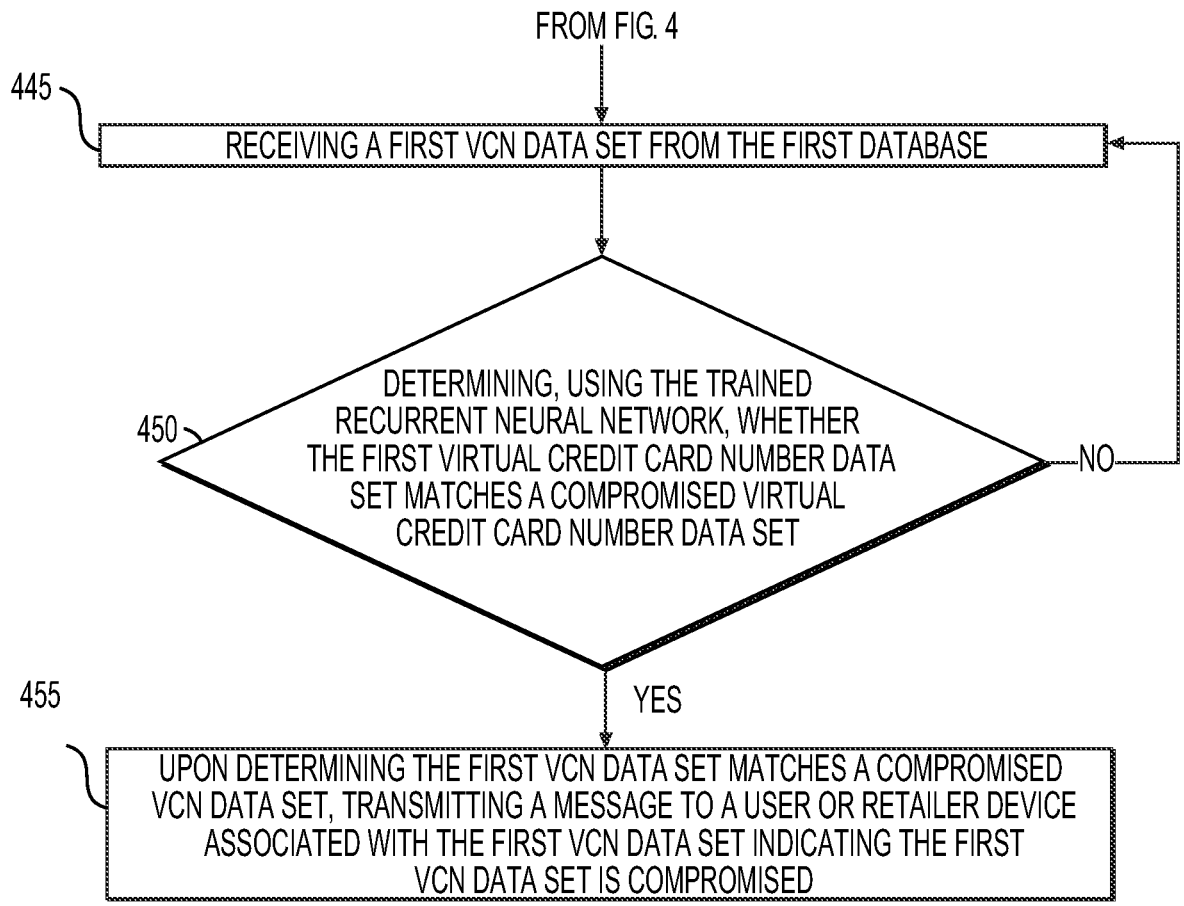

FIG. 4 depicts a flowchart of an exemplary method 400 for training and using a recurrent neural network for data breach identification using virtual card numbers (VCNs), according to embodiments of the present disclosure. In an initial step 405, processor 144, using VCN generator 148, may generate VCN data sets 145. Each of the VCN data sets 145 may be associated with a user device, a retailer device, and security data to generate a VCN data set. At a step 410, processor 144 may store the generated VCN data sets on a first database, such as, for example, customer and retailer VCN database 142, as shown in FIGS. 1-3. As explained above with respect to FIGS. 1-3, the generated VCN data sets 145 comprise virtual card numbers and associated security data. In some embodiments, the generated VCN data sets 145 may be designed to simulate a physical credit card number with associated security data. Each VCN data set may further be associated with a single customer/user device and a single retailer/merchant device. In some embodiments, the generated VCN data sets 145, in addition to including a VCN and associated security data, may further include a history of declined transactions. When an attempt is made to use a VCN with a different retailer that is not associated with the VCN, this may result in the VCN being flagged as potentially exposed, resulting in cancellation of the VCN data set and/or notification of the retailer and customer. Further, as part of determining whether a generated VCN data set 145 has been exposed, the VCN system 140 may, in addition to comparing the VCN data sets as described below at step 430, look at the declined transaction history. In this manner, a risk score may be generated based on whether a pre-determined threshold is satisfied. For example, a threshold could be set to equal a number of unique attempted retailers (in other words, if there are attempts to use the VCN at more than three unique retailers, this may flag the VCN as exposed or compromised). As another example, the threshold could be set to equal the number of transaction request attempts, such as flagging the VCN data set 145 and declining transactions, if there are more than 5 attempts to use the VCN at a different retailer or provider than the one associated with the account. Another threshold could be set to equal the number of unique unindexed websites on which the one or more compromised VCN data sets 125 appears; for example, if the generated VCN data set 145 appears to match one or more of the one or more compromised VCN data sets 125 retrieved on more than five different unindexed sites on the dark web 105, the VCN system 140 may flag the generated VCN data set 145, decline future transactions, and/or notify the retailer and/or customer. A pre-determined threshold may also be used based on a combination of the above factors, for example, the generated VCN data set 145 may be flagged or cancelled if the generated VCN data set 145 appears on an unindexed website and if there was an attempt to use the VCN at a retailer that differs from the retailer in the corresponding generated VCN data set 145.

Referring again to FIG. 4, at step 415, the VCN system 140 may receive the one or more compromised VCN data sets 125. The one or more compromised VCN data sets 125 may be parsed from the exposed retailer and/or customer data 115 stored on a second database isolated from communication with the first database, and the exposed data may be obtained from a scan of unindexed websites. The managed scraper 110, using scanner 111, may scan unindexed website data 108 from the dark web 105. When the managed scraper 110 finds exposed retailer and/or customer data 115, the managed scraper 110 may transmit the exposed retailer and/or customer data 115 to the isolated system 120. The exposed retailer and/or customer data 115 may be received by the processor 124 and server 123 of the isolated system 120, and may store the exposed retailer and/or customer data 115 on an exposed data database 121 separate from the parsed VCN database 122. The processor 124 parses the exposed retailer and/or customer data 115 for the one or more compromised VCN data sets 125 and stores the one or more compromised VCN data sets 125 on the parsed VCN database 122. In some embodiments, exposed data database 121 is isolated from other databases and systems, including parsed VCN database 122, customer and retailer VCN database 142, and VCN system 140. In this manner, illegal or inappropriate content, including malware, computer viruses, or other illegal content contained in exposed retailer and/or customer data 115 which may be mixed together with the VCN data is removed prior to transmitting the one or more compromised VCN data sets 125 on to the VCN system 140. The isolated system 120 then transmits the one or more compromised VCN data sets 125 to the VCN system 140. The processor 144 of the VCN system 140 receives and stores the one or more compromised VCN data sets 125 on the compromised VCN database 141.

At step 430, the processor 144 may compare the one or more compromised VCN data sets 125 stored on the compromised VCN database 141 with the generated VCN data sets 145 stored on the customer and retailer VCN database 142. The processor 144 may then determine at step 435 whether one of more data sets of the generated VCN data sets 145 is compromised based on the comparison. Thresholds may be utilized as explained above. For example, if one or more of the generated VCN data sets 145 stored on the customer and retailer VCN database 142 contains the same (e.g., identical) or similar VCN and security data as one or more of the one or more compromised VCN data sets 125 stored on the compromised VCN database 141, then the processor 144 may determine that the generated VCN data set 145 stored on the customer and retailer VCN database 142 is compromised.

At step 440, machine learning engine 150 may be trained based on the one or more compromised VCN data sets 125 to associate the one or more compromised VCN data sets 125 with one or more sequential patterns found within the one or more compromised VCN data set 125. The machine learning engine 150 may be a RNN trained based on the one or more compromised VCN data sets 125. As explained above, each of the one or more compromised VCN data sets 125 may comprise a VCN and associated security data. Each of the one or more compromised VCN data sets 125 may further comprise transaction data associated with the VCN. Based on the training of the RNN, the RNN may associate VCN data sets with one or more sequential patterns found within the VCN data sets.

The RNN being trained in step 440 may be any type of RNN which can use an internal state (e.g., memory) to process sequences of inputs from the one or more compromised VCN data sets 125. In some implementations, LSTM may be the type of neural network used for training of the model and the subsequent determination of whether a VCN data set matches the one or more compromised VCN data sets 125 (e.g., Step 435 as described above) in accordance with one or more embodiments of the present disclosure. The machine learning engine 150, such as the RNN or LSTM described by way of example above, may be stored in the server 143 or any other memory device accessible by the server 143.

The processor 144, using the trained machine learning engine 150 at step 445 may then receive a first generated VCN data set 145 from the customer and retailer VCN database 142. In some embodiments, the processor 144 may receive the VCN data set directly from a retailer device 170 or a user device 180. At step 450, the processor 144, using the trained machine learning engine 150, may then determine whether the VCN received from the customer and retailer VCN database 142 matches one or more of the one or more compromised VCN data sets 125 stored on the compromised VCN database 141. In some embodiments, whether the VCN received from the customer and retailer VCN database 142 matches one or more of the one or more compromised VCN data sets 125 may be determined based on a one-to-one match of numbers and/or characters or combinations therefore, a flag based on one or more thresholds, and/or a sequential pattern detected by the trained machine learning engine 150. At step 455, upon determining that the received VCN data set from the customer and retailer VCN database matches a compromised VCN data set stored on the compromised VCN database 141, the processor 144 may automatically transmit compromised VCN messages 160 to a user device 180 and/or a retailer device 170 associated with the received VCN data set indicating that the VCN data set is likely compromised. The message may be an e-mail, text message, browser or desktop notification, or other type of communication. The communication may be a natural language statement. The message may further include instructions or suggestions for responding to the compromised VCN. In some embodiments, instead of or in addition to sending a message, the processor 144 of VCN system 140 may automatically deactivate or cancel the compromised VCN, so that the compromised VCN is no longer usable for any transaction, and then generate and transmit a new VCN, e.g., a regenerated VCN 205, to a user device 180, as shown in FIG. 2. If the VCN received from the customer and retailer VCN database 142 does not match one of the one or more compromised VCN data sets 125 stored on the compromised VCN database 141, then the transaction may be authorized.

Figure 5:
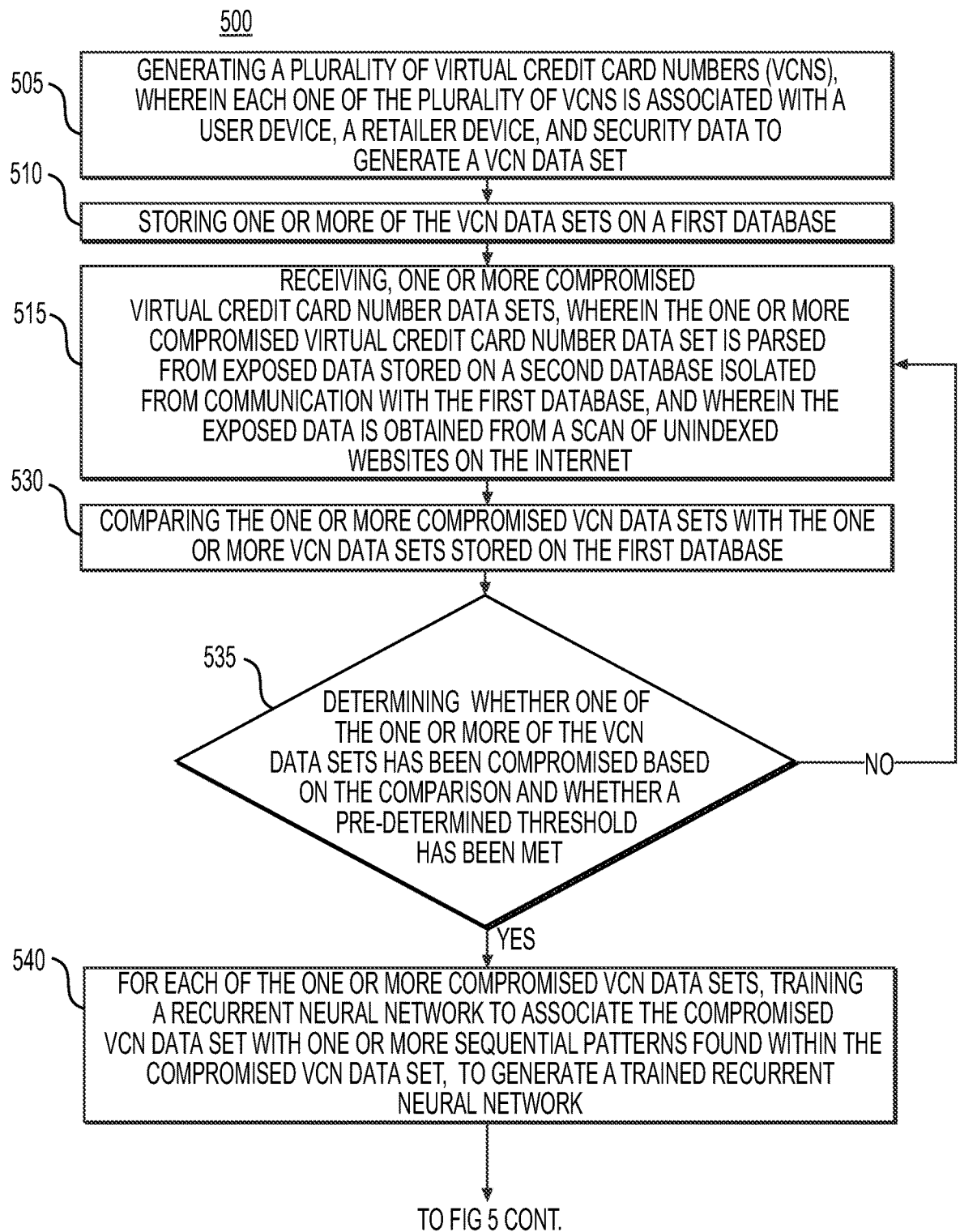
FIG. 5 depicts a flowchart of another exemplary method for training and using a recurrent neural network for data breach identification.
Figure 5:
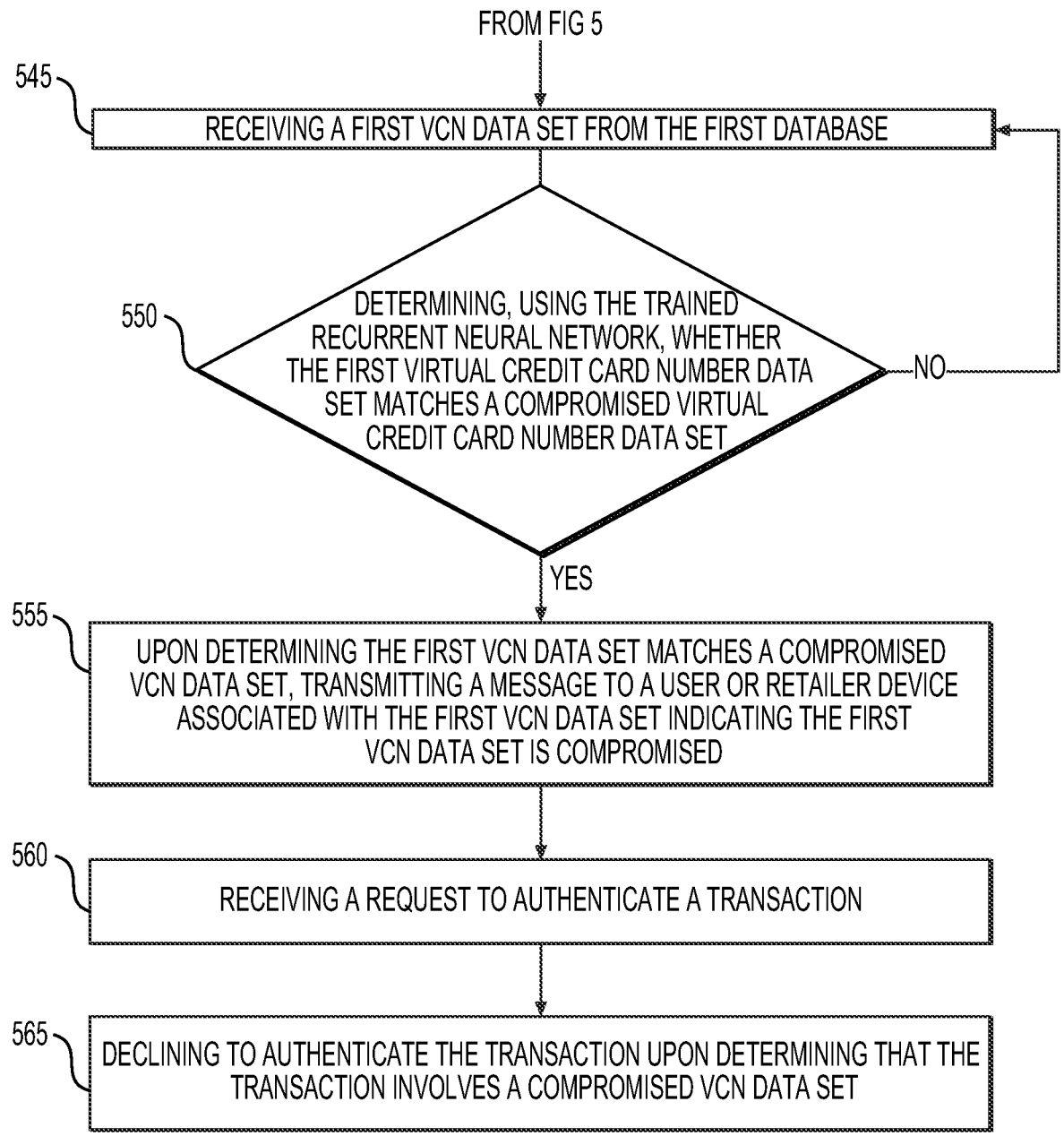

FIG. 5 depicts a flowchart of another exemplary method 500 for training and using a recurrent neural network for data breach identification using virtual card numbers, according to embodiments of the present disclosure. In an initial step 505, processor 144, using VCN generator 148, may generate VCN data sets 145. Each one of the VCN data sets 145 may be associated with a user device, a retailer device, and security data to generate a VCN data set. At a step 510, processor 144 may store the generated VCN data sets 145 on a database, such as, for example, customer and retailer VCN database 142, as shown in FIGS. 1-3. As explained above with respect to FIGS. 1-3, the generated VCN data sets 145 may include VCNs and associated security data. As explained above with respect to initial step 405 of FIG. 4, transaction histories and thresholds may also be implemented here to flag exposed or compromised VCN data sets.

Referring again to FIG. 5, at step 515, the VCN system 140 receives one or more compromised VCN data sets 125, as explained in further detail with respect to step 415 of FIG. 4, above.

At step 530, the processor 144 compares the one or more compromised VCN data sets 125 stored on the compromised VCN database 141 with the generated VCN data sets 145 stored on the customer and retailer VCN database 142. The processor 144 then determines whether one of more data sets of the generated VCN data sets 145 is compromised based on the comparison at step 535.

At step 535, the determination may be based on a threshold as explained above. For example, if a generated VCN data set 145 stored on the customer and retailer VCN database 142 contains the same VCN and security data as one of the one or more compromised VCN data sets 125 stored on the compromised VCN database 141, then the processor may determine that the generated VCN data set 145 stored on the customer and retailer VCN database 142 is compromised.

Further, a threshold for determining whether a retailer's data has been breached is also disclosed. For example, the VCN system 140 may determine that a substantial number of customers' VCNs associated with a single retailer are received from the isolated system 120. If a threshold is met, for example, a thousand VCNs associated with a retailer are discovered after dark web scraping (via managed scraper 110) in a relatively short time frame, the VCN system 140 may determine that the retailer device 170 has suffered a data breach. A notification may then be sent to the retailer device 170 indicating the likelihood of a breach, so that the retailer device 170 may take action. In some embodiments, the VCN system 140 may automatically flag and cancel all the VCNs associated with the retailer once a threshold for exposure is met, in order to prevent further fraudulent losses. Thus, a technical solution is presented here for more quickly and efficiently discovering data breaches, and mitigating future loss, at retailers using VCNs that are associated with specific retailers and customers.

At step 540 of FIG. 5, a machine learning engine 150 may be trained based on the one or more compromised VCN data sets 125 to associate the one or more compromised VCN data sets 125 with one or more sequential patterns found within the one or more compromised VCN data set 125, as explained in further detail with respect to step 440 of FIG. 4, above.

The processor 144, using the trained machine learning engine 150 at step 545 may then receive a generated VCN data set (e.g., a first VCN data set) from the customer and retailer VCN database 142. In some embodiments, the processor 144 may receive the VCN data set directly from a retailer device 170 or a user device 180. At step 550, the processor 144, using the trained machine learning engine 150, may then determine whether the VCN received from the customer and retailer VCN database 142 (e.g., the first VCN data set) matches one of the one or more compromised VCN data sets 125 stored on the compromised VCN database 141. In some embodiments, whether the VCN received from the customer and retailer VCN database 142 matches one or more of the one or more compromised VCN data sets 125 may again be determined based on a one-to-one match of numbers and/or characters or combinations therefore, a flag based on one or more thresholds, and/or a sequential pattern detected by the trained machine learning engine 150. At step 555, upon determining that the received VCN data set (e.g., the first VCN data set) from the customer and retailer VCN database 142 matches a compromised VCN data set 145 stored on the compromised VCN database 141, the processor 144 may automatically transmit compromised VCN messages 160 to a user device 180 and/or a retailer device 170 associated with the received VCN data set indicating that the VCN data set is likely compromised. The message may be an e-mail, text message, browser or desktop notification, or other type of communication. The communication may be a natural language statement. The message 160 may further include instructions or suggestions for responding to the compromised VCN. In some embodiments, instead of or in addition to sending a message 160, the processor 144 of VCN system 140 may automatically deactivate or cancel the compromised VCN, so that the compromised VCN is no longer usable for any transaction, and then generate and transmit a new VCN 205 to a user device 180 as shown in FIG. 2.

At step 560, the processor 144 may receive a request to authenticate a transaction. For example, with reference to FIG. 3, a customer, via user device 180, initiates a proposed transaction 305 using a VCN data set with retailer device 170. The retailer device 170 may then automatically transmit a transaction authentication request 310 to the processor including the VCN data set for the proposed transaction. The processor 144, using the trained machine learning engine 150, may then automatically determine whether the VCN data set of the proposed transaction 305 is likely compromised or exposed. Upon determining that the VCN data set of the proposed transaction 305 is compromised, at step 565, the processor 144 may automatically decline the transaction and send a notification to the retailer device 170 and/or user device 180. In this manner, a technological solution is presented for more quickly and accurately authenticating internet transactions and detecting online data breaches using virtual card numbers is presented.

Figure 6:
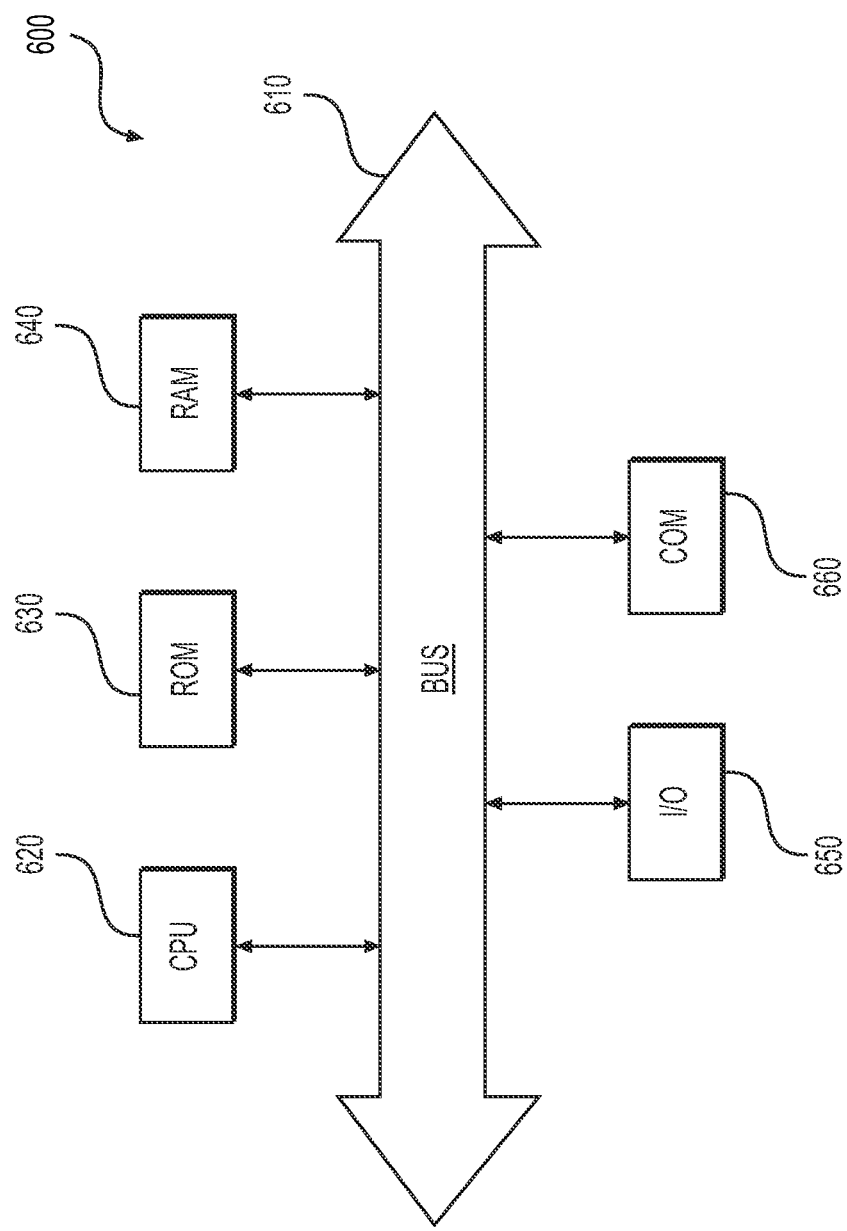
FIG. 6 depicts an example system that may execute techniques presented herein.

FIG. 6 depicts an example system 600 that may execute techniques presented herein. FIG. 6 is a simplified functional block diagram of a computer that may be configured to execute techniques described herein, according to exemplary embodiments of the present disclosure. Specifically, the computer (or "platform" as it may not be a single physical computer infrastructure) may include a data communication interface 660 for packet data communication. The platform also may include a central processing unit ("CPU") 620, in the form of one or more processors, for executing program instructions. The platform may include an internal communication bus 610, and the platform also may include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for training and using a recurrent neural network for data breach identification, the method comprising:
generating, by one or more processors, a plurality of virtual card numbers, wherein each one of the plurality of virtual card numbers is associated with a user device, a provider device, and security data to generate a virtual card number data set;
storing, by the one or more processors, one or more of the virtual card number data sets on a first database;
receiving, by the one or more processors, one or more compromised virtual card number data sets, wherein the one or more compromised virtual card number data sets is parsed from compromised data stored on a second database isolated from communication with the first database, and wherein the compromised data is obtained from a scan of unindexed websites on a network;
comparing, by the one or more processors, the one or more compromised virtual card number data sets with the one or more virtual card number data sets stored on the first database;
determining, by the one or more processors, whether one of the one or more of the virtual card number data sets has been compromised based on the comparison;
for each of the one or more compromised virtual card number data sets, training, by the one or more processors, the recurrent neural network to associate the compromised virtual card number data set with one or more sequential patterns found within the compromised virtual card number data set, to generate a trained recurrent neural network;
receiving a first virtual card number data set from the first database;
determining, using the trained recurrent neural network, by the one or more processors, whether the first virtual card number data set matches a compromised virtual card number data set by detecting at least one of the one or more sequential patterns found within the compromised virtual card number data set;
upon determining the first virtual card number data set matches a compromised virtual card number data set, automatically regenerating a virtual card number for the first virtual card number data set; and
transmitting, by the one or more processors, the regenerated virtual card number and a message to the user device or the provider device associated with the first virtual card number data set indicating the first virtual card number data set is compromised.

2. The method of claim 1, further comprising:
receiving, by the one or more processors, a request to authenticate a transaction; and
declining to authenticate the transaction upon determining, by the one or more processors, that the transaction involves a compromised virtual card number data set.

3. The method of claim 1, wherein the security data comprises one or more of a card verification value, a card verification code, a physical address number, or a personal identification number associated with a user device.

4. The method of claim 3, wherein the determining the first virtual card number data set matches a compromised virtual card number data set stored on the second database further comprises determining whether the virtual card number and one or more of the user device, provider device, or security data of the first virtual card number data set is similar to the virtual card number and one or more of the user device, provider device, or security data of the compromised virtual card number data sets stored on the second database.

5. The method of claim 4, wherein the determining the first virtual card number data set matches a compromised virtual card number data set stored on the second database further comprises determining, by the one or more processors, whether a pre-determined threshold is satisfied.

6. The method of claim 1, further comprising:
upon parsing one or more virtual card number data sets from the compromised data on the second database, storing, by the one or more processors, the parsed virtual card number data sets on a third database separate from the second database, wherein comparing the one or more compromised virtual card number data sets with the one or more virtual card number data sets stored on the first database comprises comparing the one or more compromised virtual card number data sets stored on the third database with the virtual card number data sets stored on the first database.

7. The method of claim 6, wherein the third database is located at a physical location remote from the first and second databases.

8. The method of claim 1, wherein the second database is located at a physical location remote from the first database.

9. The method of claim 1, wherein transmitting the message further includes causing presentation of the message via a user interface of a user or provider device.

10. The method of claim 9, wherein causing presentation of the message via the user interface includes presentation by at least one of a voice notification, application notification, tactile notification, or graphic notification.

11. A system for training and using a recurrent neural network for data breach identification, the system comprising:
at least one memory device having processor-readable instructions stored therein; and
at least one central processing unit including at least one processor configured to access the memory device and execute the processor-readable instructions, which when executed by the processor configures the processor to perform a plurality of functions, including functions for:
generating a plurality of virtual card numbers, wherein each one of the plurality of virtual card numbers is associated with a user device, a provider device, and security data to generate a virtual card number data set;
storing one or more of the virtual card number data sets on a first database;
receiving, by the one or more processors, one or more compromised virtual card number data sets, wherein the one or more compromised virtual card number data sets is parsed from compromised data stored on a second database isolated from communication with the first database, and wherein the compromised data is obtained from a scan of unindexed websites on a network;

comparing the one or more compromised virtual card number data sets with the one or more virtual card number data sets stored on the first database;

determining whether one of the one or more of the virtual card number data sets has been compromised based on the comparison;

training the recurrent neural network to associate the compromised virtual card number data set with one or more sequential patterns found within the compromised virtual card number data set, to generate a trained recurrent neural network;

receiving a first virtual card number data set from the first database;

determining, using the trained recurrent neural network, whether the first virtual card number data set matches a compromised virtual card number data set by detecting at least one of the one or more sequential patterns found within the compromised virtual card number data set;

upon determining the first virtual card number data set matches a compromised virtual card number data set, automatically regenerating a virtual card number for the first virtual card number data set; and transmitting the regenerated virtual card number and a message to a user or provider device associated with the first virtual card number data set indicating the first virtual card number data set is compromised.

12. The system of claim 11, wherein the processor is further configured to perform functions for:

receiving a request to authenticate a transaction; and declining to authenticate the transaction upon determining that the transaction involves a compromised virtual card number data set.

13. The system of claim 11, wherein the security data comprises one or more of a card verification value, a card verification code, a physical address number, or a personal identification number associated with a user device.

14. The system of claim 13, wherein the determining the first virtual card number data set matches a compromised virtual card number data set stored on the second database further comprises determining whether the virtual card number and one or more of the user device, second device, or security data of the first virtual card number data set is identical to the virtual card number and one or more of the user device, provider device, or security data of the compromised virtual card number data sets stored on the second database.

15. The system of claim 14, wherein the determining the first virtual card number data set matches a compromised virtual card number data set stored on the second database further comprises determining, by the one or more processors, whether a pre-determined threshold is met.

16. The system of claim 11, wherein the processor is further configured to perform functions for:

upon parsing one or more virtual card number data sets from the compromised data stored on the second database, storing the parsed virtual card number data sets on a third database separate from the second database, wherein comparing the one or more compromised virtual card number data sets with the one or more virtual card number data sets stored on the first database comprises comparing the one or more compromised virtual card number data sets stored on the third database with the virtual card number data sets stored on the first database.

17. The system of claim 16, wherein the third database is located at a physical location remote from the first and second databases.

18. The system of claim 11, wherein the processor is further configured to perform functions for:

presenting, via a user interface of a user or provider device, the message indicating the compromised first virtual card number data set.

19. The system of claim 18, wherein the message indicating the compromised first virtual card number data set is presented by at least one of a voice notification, application notification, tactile notification, or graphic notification.

20. A computer-implemented method for training and using a recurrent neural network for data breach identification, the method comprising:

generating, by one or more processors, a plurality of virtual card numbers, wherein each one of the plurality of virtual card numbers is associated with a user device, a provider device, and security data to form a virtual card number data set;

storing, by the one or more processors, one or more of the virtual card number data set on a first database;

receiving, by the one or more processors, one or more compromised virtual card number data sets, wherein the one or more compromised virtual card number data sets is parsed from compromised data stored on a second database isolated from communication with the first database, and wherein the compromised data is obtained from a scan of unindexed websites on a network;

comparing, by the one or more processors, the one or more compromised virtual card number data sets with the one or more virtual card number data sets stored on the first database;

determining, by the one or more processors, one of the one or more of the virtual card number data sets has been compromised based on the comparison and whether a pre-determined threshold has been met;

for each of the one or more compromised virtual card number data sets, training, by the one or more processors, the recurrent neural network to associate the compromised virtual card number data set with one or more sequential patterns found within the compromised virtual card number data set, to generate a trained recurrent neural network;

receiving, by the one or more processors, a first virtual card number data set from the first database;

determining, using the trained recurrent neural network, by the one or more processors, whether the first virtual card number data set is a compromised virtual card number data set by detecting at least one of the one or more sequential patterns found within the compromised virtual card number data set;

upon determining the first virtual card number data set is a compromised virtual card number data set, automatically regenerating a virtual card number for the first virtual card number data set; and transmitting, by the one or more processors, the regenerated virtual card number and a message to a user or provider device associated with the first virtual card number data set indicating the first virtual card number data set is compromised;

receiving, by the one or more processors, a request to authenticate a transaction; and declining to authenticate the transaction upon determining, by the one or more processors, that the transaction involves a compromised virtual card number data set.

* * * * *